US012717041B2

(12) United States Patent
Feyerabend et al.

(10) Patent No.: US 12,717,041 B2
(45) Date of Patent: Aug. 25, 2026

(54) METHOD FOR MONITORING A LOADING AREA

(71) Applicant: ZF CV SYSTEMS GLOBAL GMBH, Bern (CH)

(72) Inventors: Konrad Feyerabend, Hannover (DE); Sebastian Kuehne, Sarstedt (DE); Gafur Zymeri, Ronnenberg (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 303 days.

(21) Appl. No.: 18/578,747

(22) PCT Filed: Jun. 21, 2022

(86) PCT No.: PCT/EP2022/066860
§ 371 (c)(1),
(2) Date: Jan. 12, 2024

(87) PCT Pub. No.: WO2023/001466
PCT Pub. Date: Jan. 26, 2023

(65) Prior Publication Data

US 2024/0319377 A1 Sep. 26, 2024

(30) Foreign Application Priority Data

Jul. 21, 2021 (DE) ..................... 10 2021 118 874.1

(51) Int. Cl.
*G01S 17/894* (2020.01)
*G01B 11/22* (2006.01)
(Continued)

(52) U.S. Cl.
CPC ............ *G01S 17/894* (2020.01); *G01B 11/22* (2013.01); *G06V 10/764* (2022.01); *G06V 20/52* (2022.01); *G06V 20/59* (2022.01); *G06V 20/64* (2022.01)

(58) Field of Classification Search
CPC ... G06T 2207/10028; G06T 7/00; G06T 7/50; G06T 17/00; G06V 20/64; G06V 20/50; G06V 10/764
See application file for complete search history.

(56) References Cited

U.S. PATENT DOCUMENTS

2001/0030599 A1 10/2001 Zimmermann et al.
2019/0065888 A1* 2/2019 Calenzo .................. G06F 18/22
(Continued)

FOREIGN PATENT DOCUMENTS

DE 10018302 A1 10/2001
DE 102006028627 A1 10/2007
(Continued)

*Primary Examiner* — Guillermo M Rivera-Martinez
(74) *Attorney, Agent, or Firm* — LEYDIG, VOIT & MAYER, LTD.

(57) ABSTRACT

A method for monitoring a loading area, in which the interior of the loading area is three-dimensionally measured by at least one distance-measuring, depth-aware sensor, including storing as a first data set 3D data describing each measurement point of three-dimensional surfaces bordering the loading area, and 3D data describing each measurement point of any objects or load parts located in the loading area. The method further includes assigning a time stamp to the first data set and carrying out at least one further subsequent three-dimensional measurement by the sensor, wherein corresponding 3D data describing measurement points is stored as an associated second data set and also assigned a time stamp. The 3D data of the first data set is compared with spatially corresponding measurement points or point sets of the second data set by an algorithm in a computing or analysis unit.

18 Claims, 5 Drawing Sheets

(51) Int. Cl.

| | |
|---|---|
| ***G06V 10/764*** | (2022.01) |
| ***G06V 20/52*** | (2022.01) |
| ***G06V 20/59*** | (2022.01) |
| ***G06V 20/64*** | (2022.01) |

(56) References Cited

U.S. PATENT DOCUMENTS

| | | | | |
|---|---|---|---|---|
| 2020/0130963 | A1* | 4/2020 | Diankov | G06T 19/20 |
| 2020/0333789 | A1* | 10/2020 | Suzuki | G05D 1/0212 |

FOREIGN PATENT DOCUMENTS

| | | | |
|---|---|---|---|
| EP | 3232404 | A1 | 10/2017 |
| EP | 3401217 | A1 | 11/2018 |
| WO | WO 2020251362 | A1 | 12/2020 |

* cited by examiner

METHOD FOR MONITORING A LOADING AREA

CROSS REFERENCE TO RELATED APPLICATIONS

This application is a U.S. National Phase application under 35 U.S.C. § 371 of International Application No. PCT/EP2022/066860, filed on Jun. 21, 2022, and claims benefit to German Patent Application No. DE 10 2021 118 874.1, filed on Jul. 21, 2021. The International Application was published in German on Jan. 26, 2023 as WO 2023/001466 A1 under PCT Article 21(2).

FIELD

The present invention relates to a method for monitoring a loading area.

BACKGROUND

The monitoring of loading areas by means of monitoring systems, in particular by electronic systems, is becoming increasingly widespread given today's traffic flows and the requirements on the logistics of goods. In particular, the loading areas of trucks and containers are the focus of fleet operators, freight forwarders and mail order companies in this regard and must be used as efficiently as possible. For this purpose, the loading and unloading processes must also be planned, depending on the fill level of the loading area.

Such monitoring is often carried out by measuring, scanning or otherwise identifying the objects or load parts that are loaded into a loading area before or during loading. Methods are known in which, for example, cameras are mounted on forklifts, which scan the individual pieces of cargo during loading and add the results to obtain a total load or a filling level within the loading area. Other solutions work with RFID tags/labels (RFID=radio frequency identification or radio wave identification) attached to load parts, which are detected during loading or within the loading area by appropriate antennas in the loading area or, for example, on the ramp in the loading section. This means that determining a spatially defined loading state within the loading area is only possible to a limited extent. In addition, such procedures require a relatively large amount of equipment in the entire infrastructure surrounding the cargo, i.e. at loading points, on ramps, loading vehicles, etc., which of course must first be collated and evaluated in a suitable form.

In the prior art, methods are also known which can spatially determine individual load parts by means of computer-aided measurements and identify their size or dimensions.

For example, EP 3 232 404 A1 discloses a method and a system for measuring the dimensions of a target object or a load part on a pallet or on a carrier, wherein a sensor or a depth-aware camera is used to determine a 3D data set, which uses depth data, i.e. distance data (distance from the sensor), that describes the three-dimensional physical space occupied by the target object.

The 3D data obtained in this way is stored in a data space, i.e. in a data cloud or so-called point cloud. The data points of the target object stored in the data space are connected to one another via appropriate markings or indices and contain not only the data of the three-dimensional space of the target object, but are inevitably also linked to the 3D data of the plane on which the target object is located, i.e. to the 3D data of the part of the pallet floor on which the target object or the load part is placed.

The method described in EP 3 232 404 A1 is then aimed in particular at identifying the 3D data of the target object that describes planes within the target object and then removing or eliminating the 3D data points from this set that describe the plane of the pallet floor. According to the method, this is intended to facilitate the determination of the space occupied by the target object. However, this method is less suitable for identifying multiple objects within a loading area, as it is precisely the position of the objects among themselves that can be determined less accurately.

SUMMARY

In an embodiment, the present disclosure provides a method for monitoring a loading area, in which the interior of the loading area is three-dimensionally measured by at least one distance-measuring, depth-aware sensor, comprising storing as a first data set 3D data describing each measurement point of three-dimensional surfaces bordering the loading area, and 3D data describing each measurement point of any objects or load parts located in the loading area. The method further comprises assigning a time stamp to the first data set and carrying out at least one further subsequent three-dimensional measurement by the sensor, wherein corresponding 3D data describing measurement points is stored as an associated second data set and also assigned a time stamp. After the respective subsequent measurement, the 3D data of measurement points or measurement point sets of the first data set are compared with spatially corresponding measurement points or measurement point sets of the second data set by an algorithm in a computing or analysis unit. The method further comprises calculating and indexing a confidence value and completeness of modified 3D data of the second data set using the algorithm if changes in the 3D data are identified from the comparison of the 3D data of spatially corresponding measurement points or measurement point sets of the first and second data sets. The method further comprises providing a further processable signal describing the identified changes and/or generating 3D data from it for a visual representation of the loading area, a spatial allocation of objects or load parts in the loading area and a current loading state, for display on a monitor or a display device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
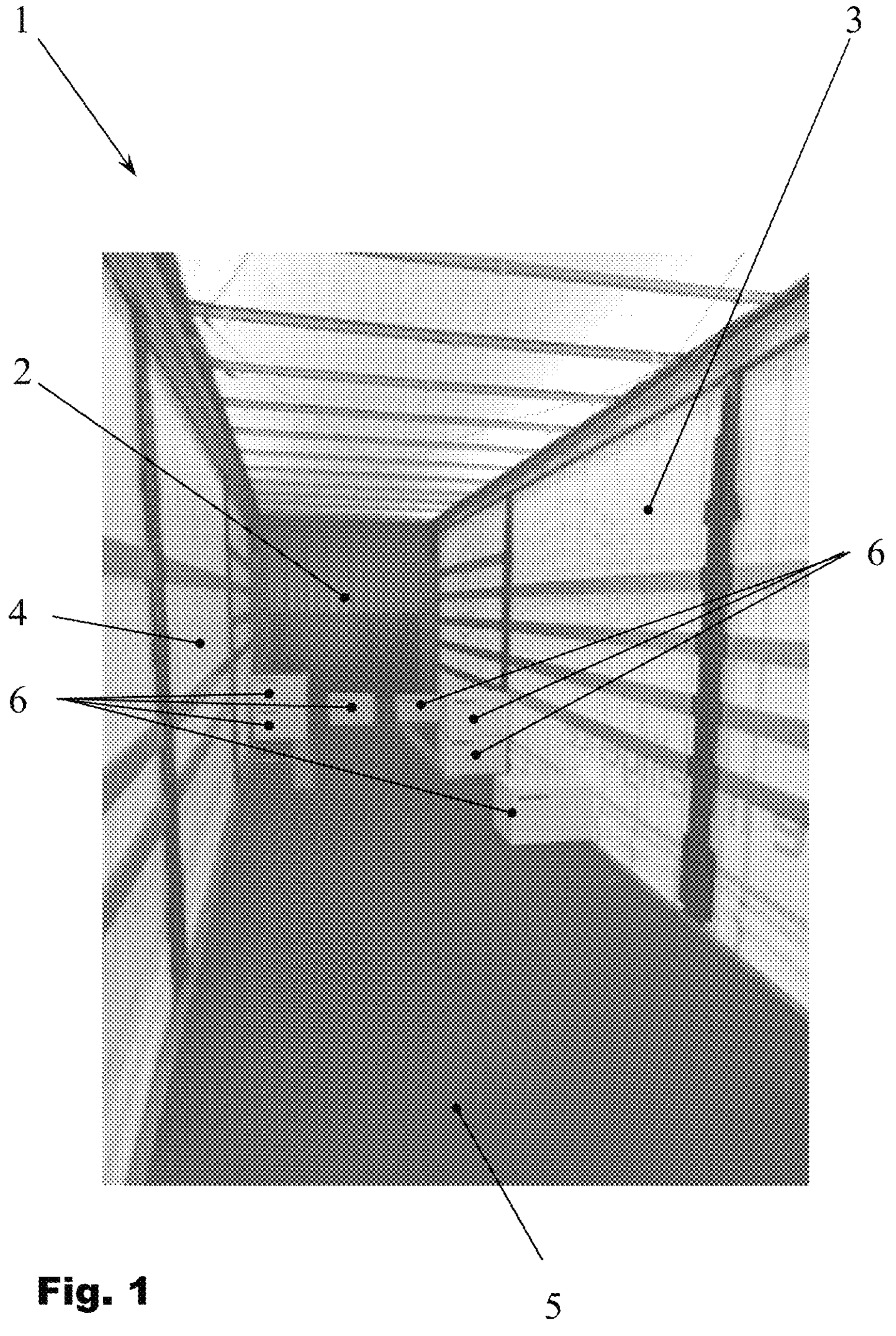
FIG. 1 illustrates a sketched view into the interior of a loading area.

In an embodiment, the present invention provides an improved method for monitoring loading areas, which enables not only the objects or load parts in the loading area as such to be identified and measured, but which also allows the location of the objects and the change in the location of such objects within the loading area to be determined. Furthermore, a method is provided which can be applied without too extensive interference with other surrounding systems, which provides sufficiently reliable results for the determination and monitoring of a loading area and which can be used for loading areas of any design.

A device for carrying out the method and a vehicle with a loading area are also disclosed.

The interior of the loading area is three-dimensionally measured with at least one distance-measuring depth-sensitive sensor (depth-aware sensor). For this purpose, 3D data describing each measurement point of three-dimensional surfaces bounding the loading area and 3D data points describing each measurement point of any objects or load parts located in the loading area are stored as a first data set (3D point cloud) and assigned a time stamp. Thereafter, by means of the sensor, at least one subsequent, corresponding three-dimensional measurement is carried out, wherein in this subsequent measurement also, the 3D data describing corresponding measurement points is stored as an associated second data set and also assigned a time stamp. The ordinal "second" is to be understood here as "any further" in the sense of each repeating subsequent measurement.

The measurements with the distance-measuring, depth-aware sensor can be carried out periodically, which is advantageous with regard to continuous status determination, but they can also be carried out at irregular time intervals or as required.

By means of an algorithm in a computing or analysis unit, the 3D data points of measurement points or measurement point sets of the first data set are compared with respective spatially corresponding measurement points or measurement point sets of the second data set after the respective subsequent measurement, wherein, in the event that changes in the 3D data are identified from the comparison of the 3D data of spatially corresponding measurement points or measurement point sets of the first and second data sets, a confidence value and completeness of the modified 3D data of the second data set are first calculated using the algorithm and indexed accordingly, Thereafter a further processable signal describing the identified changes is provided and/or 3D data is generated from it for a visual representation of the loading area, of a spatial allocation of the load parts in the loading area and of a current loading state, in particular for display on a monitor or display device.

The 3D data thus determined and stored advantageously contains the parameters of the objects or load parts located in the loading area, in particular with regard to their respective position and their dimensions, in particular lengths, width, height and depth, thus enabling the measurement of the load parts as well as the measurement of the loading area or measurement of the surfaces bordering the loading area. The 3D data represents so-called depth data, namely the "depths", or in other words the distances of the corresponding measurement points from the sensor. In this way, the distances of each detected surface of an object from the sensor and thus their position can be identified. A repetition of the measurement makes it possible to determine the change in this data and so, in the event that such a change is actually detected after a certain time or a number of measurements, to infer the change in the objects or load parts within the loading area.

The further processable signal provided can of course also contain all the parameters calculated from the 3D data, for example those that describe the position and dimensions of objects or load parts.

The 3D data can also be used as a basis for further model calculations or for the generation of video data, which can then be displayed on a monitor and produce a three-dimensional image that represents the current loading state. The data or their processing can be sent via communication devices, for example, to the headquarters of a haulage company or to authorities whose task is to monitor the load and, in particular, faulty loading or overloading.

Advantageously, during or as part of the three-dimensional measurement of the objects or load parts located in the loading area, their parameters are stored as 3D data in 3D-data sets, so-called 3D-data clusters or 3D-point clusters, assigned to each of the objects or load parts. Such data sets or point clusters can be identified, for example, by their property of describing characteristic geometries, i.e., by means of the data describing their position in a coordinate system, and considered as patterns for further calculations, so that a rapid and simple assignment of changes is possible.

An advantageous development for the classification of detected changes is that by means of the algorithm, the modified 3D data is subjected to the following conditional tests and assigned to corresponding circumstances, namely:

a) if the change in the 3D data compared to the preceding measurement
   comprises 3D data describing previously undetected objects or load parts,
   at spatially corresponding measurement points or measurement point sets, in response to circumstance (a) "Loading/adding of an object or load part" is detected, i.e. previously unknown parameters/data are present at a location where they have not been measured before.

b) If the change in the 3D data compared to the preceding measurement
   comprises 3D data describing previously detected objects or load parts,
   at spatially non-corresponding measurement points or measurement point sets, in response to circumstance (b) "Relocation of an object or load part" is detected, i.e. the same parameters/data are present or have been discovered at another location.

c) If the change in the 3D data compared to the preceding measurement
   no longer comprises 3D data describing previously detected objects or load parts,
   at spatially corresponding measurement points or measurement point sets, in response to circumstance (c) "Load part or object removed" is detected, i.e.

parameters/data that were present at a location during the preceding measurement, no longer exist.

Depending on circumstance (a, b, c), a corresponding further processable signal is provided and/or 3D data is generated for a visual representation of the loading area, of the spatial allocation of the load parts in the loading area and a current loading state, in particular for display on a monitor or display device.

The term "spatially corresponding measurement points or measurement point sets" describes the measurement points within the measured space (loading area) that describe or occupy the same spatial position as in the preceding measurement, i.e., identify the same location in the three-dimensional coordinate system.

Fundamental to such a conditional test is the continuous determination of whether, when comparing the 3D data of spatially corresponding measurement points or measurement point sets of the first and second data sets, the changes determined in the 3D data are spatially located within the loading area.

This is relatively simple to design, since the 3D data of the boundary surfaces of the loading area, i.e. the floor, side walls and ceiling, as shown above, are also stored in identifiable 3D clusters and are thus known and "set" for all further measurements. This information is then used to easily distinguish between 3D data that describes the loading area as such, and 3D data that describes the load parts or objects.

Advantageously, the origin of the coordinate system is placed in a corner of the load compartment opposite to the sensor. For this purpose, the sensor is arranged on a wall of a loading area fitted with a loading opening, and directed to the opposite wall such that the measurement range of the sensor comprises the entire loading area, the origin of the three-dimensional measurements being calibrated in a corner of the loading area. Of course, any other point can also be used as the origin of the coordinate system. In such a sensor arrangement, the entire loading area up to the front wall is then located in the measurement range, which cannot be easily obstructed by objects or load parts that may be placed in front of it.

In an advantageous embodiment of the method, in the event of a change according to circumstance (a), (b) or (c), the set of the modified 3D data is classified as a subset or 3D data cluster and assigned an identifier at least for identification, for spatial determination and for determining the parameters of the object or load part described by the subset.

In this context, an advantageous embodiment of the method is obtained from the fact that, in the event of a change according to circumstance (a), (b) or (c), the subsets or 3D data clusters are compared with other 3D data clusters from the surrounding spatial neighborhood and then classified and assigned an identifier. In the event that measurement points are not available in sufficient number or that the sensor, for example due to a constellation of other load parts, is not able to find sufficient measurement points, similar data available in the vicinity, available from preceding or multiple successive measurements, can be examined. For example, surfaces with identical orientation, but which are identified as being at different distances from the sensor, can indicate that another object has been placed in front of an already existing object. Such surfaces can represent the front sides of loaded parts or walls of the loading area. For simplification purposes, reference is made to FIGS. 4 and 5 and the corresponding figure descriptions.

This method can therefore be used to determine whether an object or load part in the loading area has been added, removed, or moved from its original location to another location in the loading area. New objects or load parts that have been added within the loading area will then in turn receive their associated 3D data clusters, which can be identified during further measurements.

It is advantageous here if the 3D data of the three-dimensional surfaces delimiting the loading area belonging to the measurement points or measurement point sets as identified and identifiable 3D data clusters are also defined as system limits for each comparison between preceding "first" and subsequent "second" data sets.

An advantageous embodiment involves designing the sensor as an optical depth sensor, preferably as a time-of-flight camera (TOF camera) or stereo camera. A TOF camera therefore delivers for each pixel, the distance to the object imaged on that pixel. An entire scene can be recorded at once without needing to scan it individually, which of course leads to faster processing of the corresponding signals. Depending on the application, it is also advantageous if the sensor is designed as a LiDAR sensor (light imaging, detection and ranging) or laser scanner (light amplification by stimulated emission of radiation), which is a less expensive alternative for a rasterized scanning. These systems are known per se.

In an advantageous embodiment, a confidence level and completeness of the modified 3D data of the second data set is examined and/or a threshold value for noise is determined during the measurement or classification.

This can be carried out, for example, by evaluating how the measurement values that indicate the distances between measurement points or measurement point sets change over time. The chronological history can be used to determine on the basis of limits or circumstances/occurrences whether, for example, an expected measurement value, i.e. the occurrence of a measurement point described by 3D data in a certain expected range, i.e. at a certain distance, appears, for example, only after a time threshold has been exceeded or only occurs for a short period of time and then disappears again, i.e. does not remain stable.

By means of the three-dimensional measurement of the loading area described, the instantaneously determined state and the previous state determined during the continuous measurement are therefore known, and thus also the parameters of the corresponding objects or load parts, namely their depth (distance from the sensor), their width, their height, their position and their volumes.

By comparing the currently determined 3D data of a 3D cluster with the already existing 3D cluster information and performing additional tests to determine whether the 3D data has a minimum quality or stability, or whether it does not appear sufficiently often in an expected range, it will also be apparent, for example, whether the sensor was not able to measure certain regions. Similarly, it is thus possible to analyze the 3D data of the environment of the respective measurement points and compare it with the continuous data.

In an advantageous embodiment, a visual representation of the loading area, the spatial allocation of the objects or load parts in the loading area and of the current loading state are displayed on a monitor in the form of a three-dimensional load image, preferably displaying only the surfaces visible from the sensor. A corresponding computational processing of the 3D data then delivers easily interpreted images on a monitor, which allow a very fast and intuitive assessment by a person supervising the loading.

In an advantageous embodiment the periodic measurement of the 3D data of each measurement point is preferably carried out at a frequency of 1 Hz (once per second). Such a periodic examination is sufficiently dynamic to monitor a loading area during loading or other monitoring operations.

In an advantageous embodiment, from the 3D data describing the width, height and depth of each individual object or load part in the loading area, the required floor space and/or the volumes of the objects or load parts are ascertained and/or determined in relation to the available loading area space or in relation to the available volume of the loading area. Then, for example, the total occupied volume can be calculated from the sum of all calculated volumes of all objects and thus the remaining free volume in the loading area can also be determined. The same applies to the calculation of the total surface area occupied by all objects in relation to the free, unoccupied surface area. The relevance of such determinations for load planning by e.g. fleet operators or haulage companies should be immediately evident.

An advantageous embodiment includes providing the further processable signal for storage in data processing systems, in particular for use in control devices and for use and processing within a data communication system. Thus, via any other available connected radio devices in the vehicle belonging to the loading area, signals representing the loading state can also be sent to the headquarters of a haulage company or fleet operator.

In addition, a device is disclosed which is suitable for monitoring a loading area and for carrying out the method according to embodiments of the invention. The device has at least one distance-measuring, depth-aware sensor for periodically repeated, three-dimensional measurement of the loading area, and a computing or evaluation unit with a programmed algorithm. By means of the computing or analysis unit thus provided and the algorithm, the 3D data of each measurement point of the three-dimensional surfaces bounding the loading area and the 3D data of each measurement point of any objects or load parts in the loading area are determined by repeated measurement, stored as data sets (3D point cloud) and compared with each other according to the method according to embodiments of the invention, and if changes are detected a processable signal is provided. The advantage of this lies in the usability and/or provision of such a device for arbitrary loading areas, i.e. for example for loading areas of trucks, but also for cargo containers of ships or other vehicles.

The method according to an embodiment of the invention and the device particularly adapted for this purpose are particularly suitable for a vehicle with a loading area, for example for a truck, a trailer vehicle or a train set. It can also be very easily used in containers transported in other vehicles. The vehicle or container has a loading area which is fitted with at least one distance-measuring, depth-aware sensor provided in the interior of the loading compartment for three-dimensional measurement, wherein the vehicle further comprises a computing or analysis unit with a programmed algorithm, with which the 3D data of each measurement point acquired by the sensor is stored in a first data set (3D point cloud), processed according to the method according to an embodiment of the invention and compared with at least one second data set.

FIG. 1 shows a sketched view into the interior of a loading area 1, namely from its rear tail lift looking towards the front wall 2. The right boundary wall 3, the left boundary wall 4, the loading surface or the floor 5 and the front boundary wall 2 can be identified. Also recognizable are various objects, namely different load parts 6 distributed on the loading area floor 5. This is the loading area of a truck, the loading surface of which is fitted with a framework of struts and battens, which is covered with a tarpaulin.

A distance-measuring sensor, e.g. a TOF sensor is located in an upper corner of the rear tailgate of the loading area 1. This location is particularly well suited for the arrangement of such a sensor, since the entire loading area up to the front wall is then within the measurement range of the sensor and the measurement range is also not obstructed by objects or load parts placed in front of it, provided, of course, the load is always properly stowed deep in the loading area.

Figure 2:
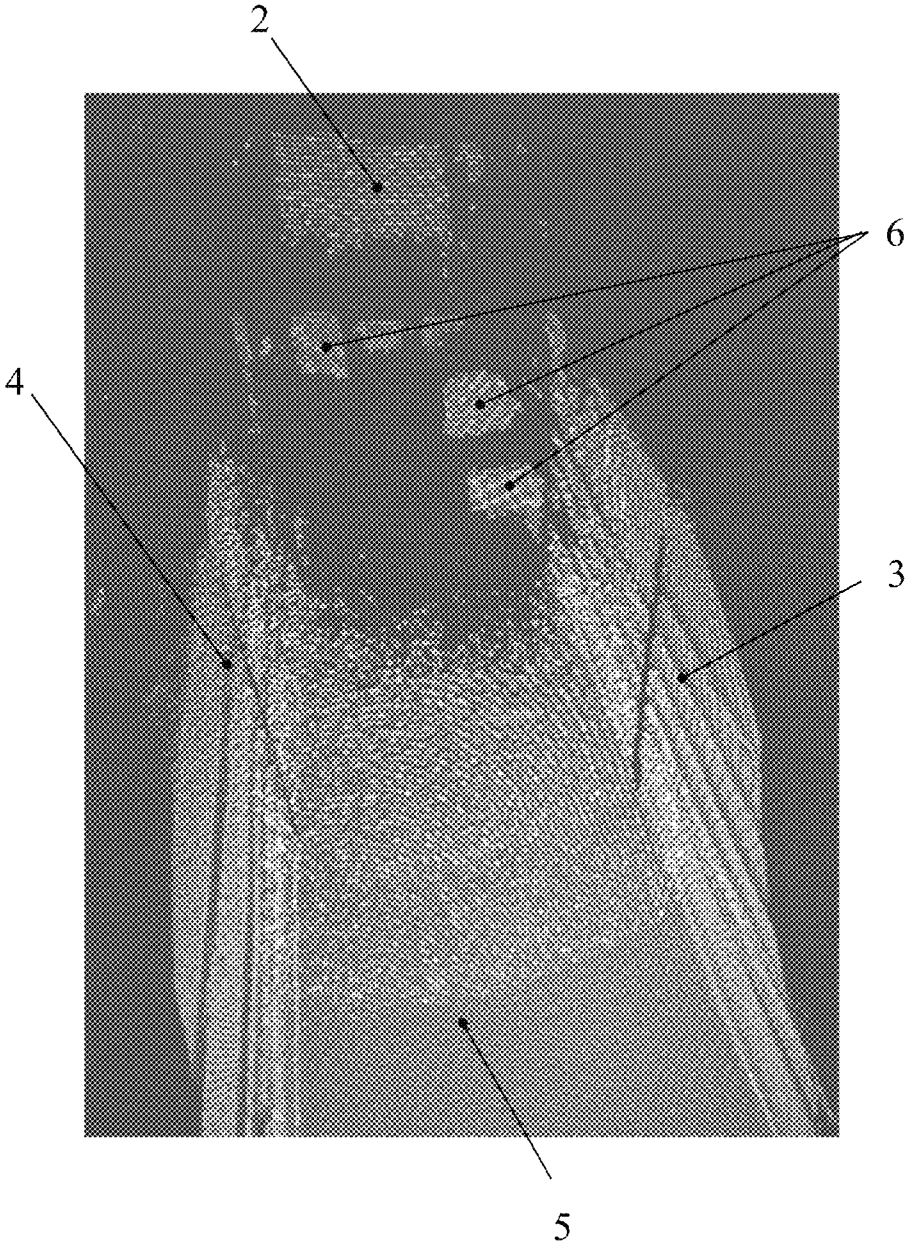
FIG. 2 illustrates a monitor display of a spatial arrangement/allocation of the load parts in the loading area according to the method according to an embodiment of the invention.

FIG. 2 shows a monitor display in which, for a state according to FIG. 1, the signal generated by means of the method according to an embodiment of the invention after determination of the changes is used to provide a visual representation of the loading area. A corresponding computational processing of the 3D data then provides the images shown here, which reveal the spatial arrangement and allocation of the load parts in the load compartment and the current loading state. The origin of the three-dimensional measurements here was placed in the lower right corner of the front wall 2 of the loading area 1. Of course, any other point can also be used as the origin of the coordinate system.

Figure 3:
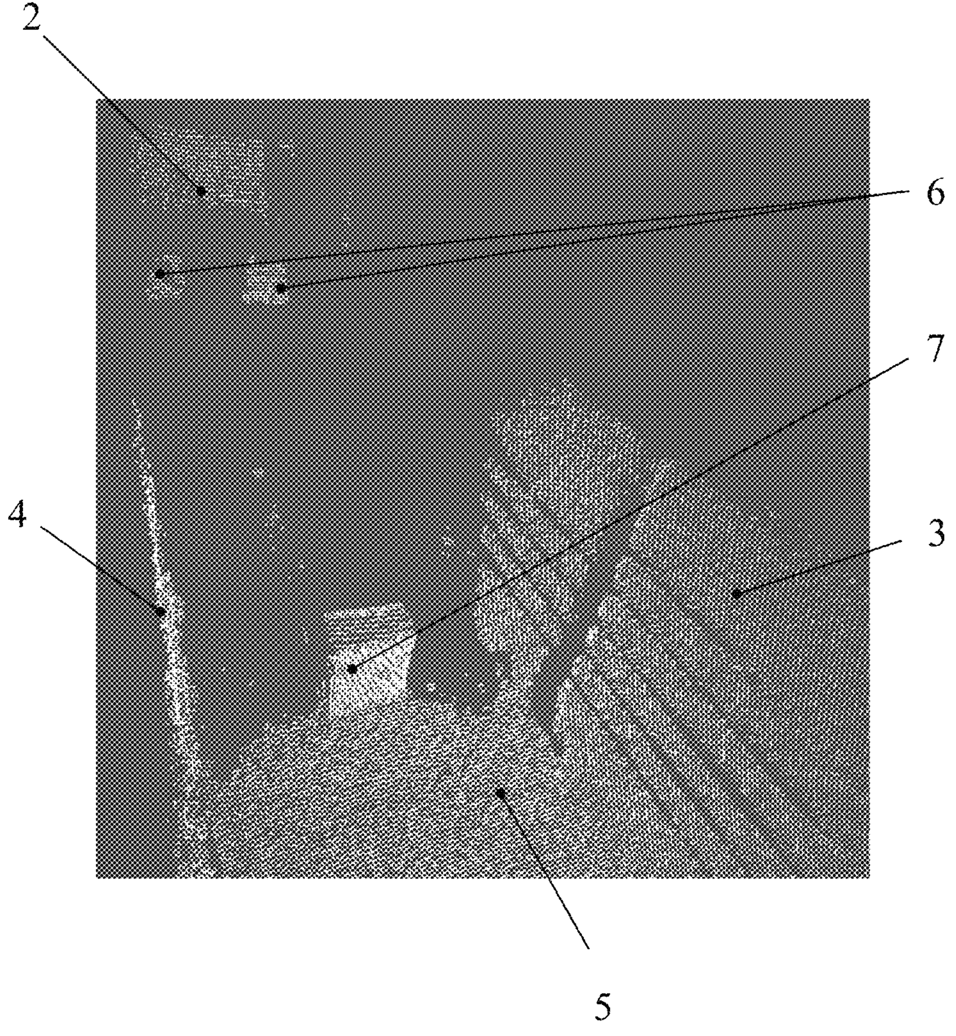
FIG. 3 illustrates a monitor display of a further spatial arrangement/allocation of the load parts in the loading area according to the method according to an embodiment of the invention.
Figure 4:
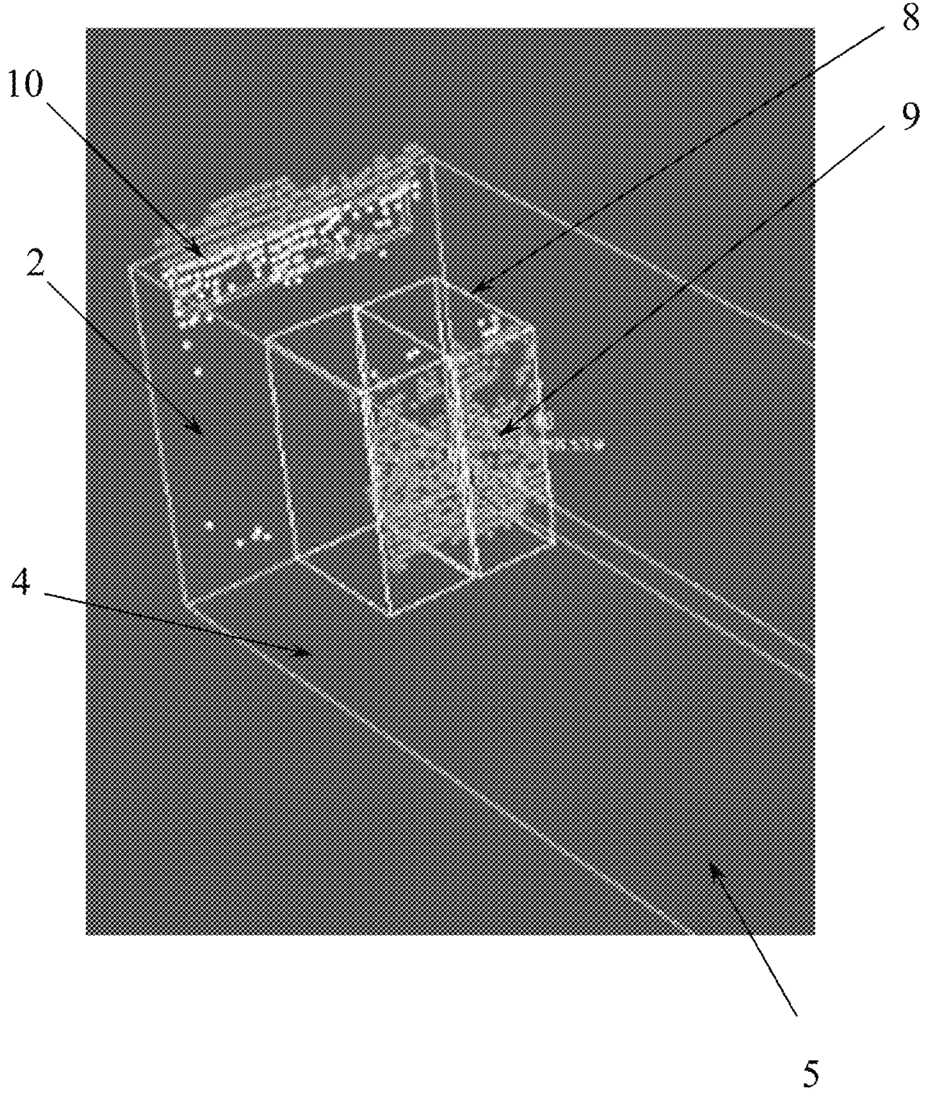
FIG. 4 illustrates a monitor display of a spatial arrangement/allocation of the load parts in the loading area after a comparison according to an embodiment of the invention with 3D-data clusters from the surrounding spatial neighborhood.
Figure 5:
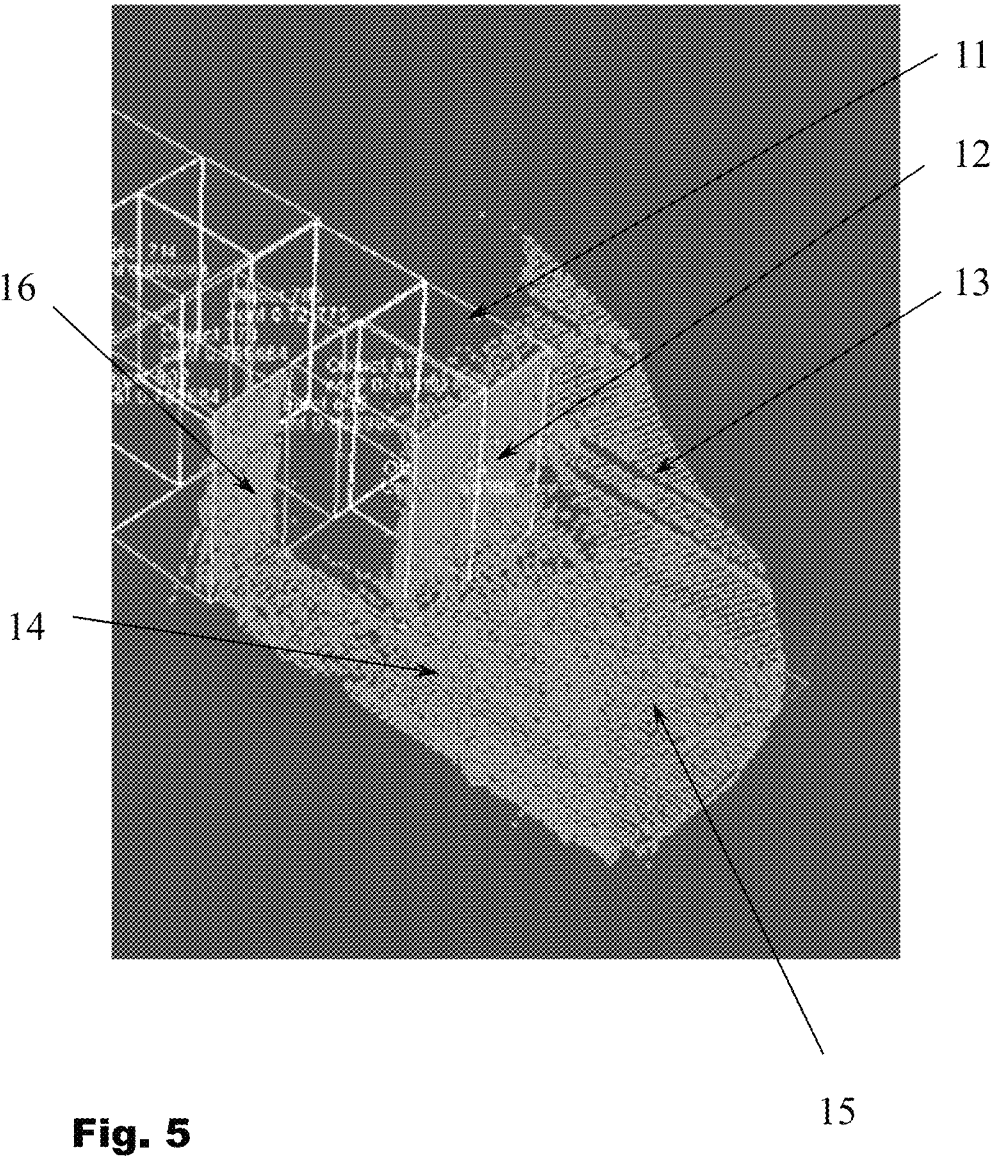
FIG. 5 illustrates a monitor display of a further spatial arrangement/allocation of the load parts in the loading area after a comparison according to an embodiment of the invention with 3D-data clusters from the surrounding spatial neighborhood.

The same applies in principle to the illustrations according to FIGS. 3 to 5, which, however, describe constellations of objects other than those shown in FIG. 1 and have been partially converted to three-dimensional representations at different angles for clarity.

FIG. 2 thus shows the condition of the loading area shown in FIG. 1, but represented by means of the 3D data processed into a monitor or video signal, which was prepared from the signal determined by means of an embodiment of the inventive method. The right boundary wall 3, the left boundary wall 4, the loading surface or the floor 5 and the front boundary wall 2 are also recognizable here. Also recognizable are the various objects, or load parts 6, distributed on the loading area floor 5. It is clear that the TOF camera used here for measurement has a sensitivity that also allows the supporting structure for the tarpaulin, consisting of struts and battens, to be identified. Thus a representation of the measurement points is essentially shown, for which a depth signal and 3D data can be acquired by means of the sensor.

FIG. 3 now shows a situation which has changed compared to the illustration according to FIG. 2. Here, the 3D data determined in a subsequent measurement has been subjected to conditional tests using the algorithm and changes have been detected, namely the case (a), that a change in the 3D data has occurred compared to the preceding measurement (FIG. 2). Here, 3D data from previously undetected objects or load parts exists at spatially corresponding measurement points or measurement point sets, at which such data was not present during previous measurements. Thus, here it is identified according to an embodiment of the invention that a new object or load part 7 has been added, that is, an "additional loading" took place.

Here it can be clearly seen that the added object or load part 7 is located at a place where, in the previous measurement illustrated by FIG. 2, only the 3D data for the lower boundary surface of the loading area, namely the 3D data of the loading area floor, was present.

FIG. 4 shows a monitor view for a case in which, despite a lack of completeness of 3D data of a data set, the presence of an object could be determined. According to an embodiment of the invention, the position as well as width, height and depth was determined from the 3D data and displayed using grid lines, which sketch both the outline of the load compartment with side walls, loading area floor and front wall and the outlines of a new load part 8 added in the load compartment.

It can be clearly seen that only measurement points 9 on the front of the new load part 8 could be measured by the sensor, i.e. only measurement points on the "sight side" of the sensor, while on the top and on the side surface of the new load part 8 apparently no measurement data were available.

However, it can also be seen that the rear surface, i.e. facing the sensor, of the front wall 2 of the loading area has been detected by the sensor and that measurement points 10 were available there, which here in this illustration of FIG. 4 have been converted into 3D data and subsequently into video data.

Here, a comparison of the 3D data clusters of the current measurement with the 3D data clusters in the spatial neighborhood, which were determined in the previous or one of the preceding measurements, is now carried out using the method according to an embodiment of the invention.

The method according to an embodiment of the invention is able to use the algorithm to infer to a sufficient extent the presence of a further load part 8 solely by forming the difference of the 3D data of these two adjacent visual surfaces, i.e. from a specific comparison between previously determined data and current data.

A similar identification of load parts by comparison between 3D data for measurement points, which were recorded by the sensor in a previous and a subsequent measurement and input to a subsequent comparison according to an embodiment of the invention, is shown again in FIG. 5 for the sake of completeness. There, a new load part 11 also produces measurement points or measurement values 12 only on its front face, which are detected by the sensor. Based on a comparison according to an embodiment of the inventive method with the previously recorded 3D data of the walls (measurement data 13, 14), the floor (measurement data 15) and the front wall of further load parts, from which measurement values 16 can be acquired, the presence of the load part 11 can be concluded.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Part of the Description

1 loading area of a truck
2 front wall of the loading area
3 right-hand boundary wall of the loading area
4 left-hand boundary wall of the loading area
5 loading surface/loading area floor
6 load part/object
7 load part/object
8 load part/object
9 measurement points on the front of the load part 8
10 measurement points on the front wall 2
11 load part/object
12 measurement points on the front of the load part 11
13 measurement points on the right loading area wall
14 measurement points on the left loading area wall
15 measurement points on the loading surface

The invention claimed is:

1. A method for monitoring a loading area, in which an interior of the loading area is three-dimensionally measured by at least one distance measuring, depth-aware sensor, comprising:

storing as a first data set:

three-dimensional (3D) data describing each measurement point of three-dimensional surfaces bordering the loading area, and 3D data describing each measurement point of any objects or load parts located in the loading area;

assigning a time stamp to the first data set;

carrying out at least one further subsequent three-dimensional measurement by the sensor, wherein corresponding 3D data describing measurement points of the objects or load parts from the at least one further subsequent three-dimensional measurement is stored as an associated second data set and also assigned a time stamp;

after the subsequent measurement, comparing the 3D data of measurement points or measurement point sets of the first data set with spatially corresponding measurement points or measurement point sets of the second data set by an algorithm in a computing or analysis unit;

calculating and indexing a confidence value and completeness of modified 3D data of the second data set using the algorithm if changes in the 3D data are identified from the comparison of the 3D data of spatially corresponding measurement points or measurement point sets of the first and second data sets; and providing a further processable signal describing the identified changes and/or generating 3D data from it for a visual representation of the loading area, a spatial allocation of objects or load parts in the loading area and a current loading state, for display on a monitor or a display device.

2. The method as claimed in claim 1, wherein the interior of the loading area is periodically three-dimensionally measured.

3. The method as claimed in claim 1, wherein, during the three-dimensional measurement of the objects or load parts located in the loading area, parameters thereof are stored as 3D data with regard to their position and their respective width, height and depth.

4. The method as claimed in claim 1, further comprising classifying each of the identified changes by the algorithm, the modified 3D data is-being subjected to the following conditional tests and assigned to corresponding circumstances:

a) if a respective change of the identified changes in the 3D data compared to a preceding measurement, comprises 3D data describing previously undetected objects or load parts, at spatially corresponding measurement points or measurement point sets, detecting a first circumstance corresponding to a loading/adding of an object or load part, b) if a respective change of the identified changes in the 3D data compared to the preceding measurement, comprises 3D data describing previously detected objects or load parts, at spatially non-corresponding measurement points or measurement point sets, detecting a second circumstance corresponding to a relocation of an object or load part, c) if a respective change of the identified changes in the 3D data compared to the preceding measurement, no longer comprises 3D data describing previously detected objects or load parts, at spatially corresponding measurement points or measurement point sets, detecting a third circumstance corresponding to a load part or object being removed, after which, depending on the detected circumstance, a corresponding further processable signal is provided and/or 3D data is generated for the visual representation of the loading area, the spatial allocation of the objects or load parts in the loading area and the current loading state for display on the monitor or display device.

5. The method as claimed in claim 4, in which, upon a change according to the detected circumstance, the set of the modified 3D data is classified as a subset or 3D data cluster and assigned an identifier at least for identification, for spatial determination and for determining the parameters of the object or load part described by the subset.

6. The method as claimed in claim 5, wherein upon the change according to the detected circumstance, the subsets or 3D data clusters are compared with further 3D data clusters from a surrounding spatial neighborhood and then classified and assigned an identifier.

7. The method as claimed in claim 1, wherein the sensor is configured as an optical depth sensor.

8. The method as claimed in claim 1, wherein the sensor is configured as a LiDAR sensor or laser scanner.

9. The method as claimed in claim 1, wherein the sensor is arranged on a wall of the loading area fitted with a loading opening, is directed to the opposite wall, and the measuring range of the sensor comprises the entire loading area, an origin of the three-dimensional measurements being calibrated in a corner of the loading area.

10. The method as claimed in claim 1, wherein the confidence level and completeness of the modified 3D data of the second data set is checked and/or a threshold value for noise is determined during the measurement or classification.

11. The method as claimed in claim 1, wherein checking whether the identified changes in the 3D data are within the loading area is carried out by the fact that the 3D data of the three-dimensional surfaces delimiting the loading area belonging to the measurement points or measurement point sets as identified and identifiable 3D data clusters are defined as system limits for any comparison between preceding first and subsequent second data sets.

12. The method as claimed in claim 1, wherein a visual representation of the loading area, the spatial allocation of the objects or load parts in the loading area and of the current loading state, are displayed on a monitor in the form of a three-dimensional load image.

13. The method as claimed in claim 2, wherein the periodic measurement of the 3D data of each measurement point is carried out at a frequency of 1 Hz.

14. The method as claimed in claim 3, wherein from the 3D data describing the width, height and depth of each individual object or load part in the loading area, a required floor space and/or volumes of the objects or load parts are ascertained and/or determined in relation to the available loading area space or in relation to an available volume of the loading area.

15. The method as claimed in claim 1, wherein the further processable signal is provided for storage in data processing systems for use in control devices and for use and processing within a data communication system.

16. A device for monitoring a loading area, the device comprising:

at least one distance-measuring, depth-aware sensor for repeated, three-dimensional measurement of the loading area; and a computing or analysis unit comprising a non-transitory computer-readable medium having processor-executable instructions stored thereon, wherein the processor-executable instructions, when executed by one or more processors, facilitate performance of a method comprising:

storing as a first data set:

three-dimensional (3D) data describing each measurement point of three-dimensional surfaces bordering the loading area, and 3D data describing each measurement point of any objects or load parts located in the loading area;

assigning a time stamp to the first data set;

carrying out at least one further subsequent three-dimensional measurement by the sensor, wherein corresponding 3D data describing measurement points of the objects or load parts from the at least one further subsequent three-dimensional measurement is stored as an associated second data set and also assigned a time stamp;

after the subsequent measurement, comparing the 3D data of measurement points or measurement point sets of the first data set with spatially corresponding measurement points or measurement point sets of the second data set by an algorithm in the computing or analysis unit;

calculating and indexing a confidence value and completeness of modified 3D data of the second data set using the algorithm if changes in the 3D data are identified from the comparison of the 3D data of spatially corresponding measurement points or measurement point sets of the first and second data sets; and providing a further processable signal describing the identified changes and/or generating 3D data from it for a visual representation of the loading area, a spatial allocation of objects or load parts in the loading area and a current loading state, for display on a monitor or a display device.

17. A vehicle comprising:

a loading area, wherein the vehicle has at least one distance-measuring, depth-aware sensor for three-dimensional measurement provided in an interior of a loading compartment; and a computing or analysis unit comprising a non-transitory computer-readable medium having processor-executable instructions stored thereon, wherein the processor-executable instructions, when executed by one or more processors, facilitate performance of a method comprising:

storing as a first data set:

three-dimensional (3D) data describing each measurement point of three-dimensional surfaces bordering the loading area, and 3D data describing each measurement point of any objects or load parts located in the loading area;

assigning a time stamp to the first data set;

carrying out at least one further subsequent three-dimensional measurement by the sensor, wherein corresponding 3D data describing measurement points of the objects or load parts from the at least one further subsequent three-dimensional measurement is stored as an associated second data set and also assigned a time stamp;

after the subsequent measurement, comparing the 3D data of measurement points or measurement point sets of the first data set with spatially corresponding measurement points or measurement point sets of the second data set by an algorithm in the computing or analysis unit;

calculating and indexing a confidence value and completeness of modified 3D data of the second data set using the algorithm if changes in the 3D data are identified from the comparison of the 3D data of spatially corresponding measurement points or measurement point sets of the first and second data sets; and providing a further processable signal describing the identified changes and/or generating 3D data from it for a visual representation of the loading area, a spatial allocation of objects or load parts in the loading area and a current loading state, for display on a monitor or a display device.

18. The method as claimed in claim 7, wherein the sensor is configured as a time-of-flight camera or stereo camera.

* * * * *